(12) United States Patent
Dansui et al.

(10) Patent No.: US 6,461,767 B1
(45) Date of Patent: Oct. 8, 2002

(54) NICKEL-METAL HYDRIDE SECONDARY BATTERY COMPRISING A COMPOUND SILICATE

(75) Inventors: Yoshitaka Dansui, Fujisawa (JP); Tatsuhiko Suzuki, Kamakura (JP); Hideki Kasahara, Naka-gun (JP); Takeshi Yao, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 104 days.

(21) Appl. No.: 09/599,014

(22) Filed: Jun. 21, 2000

(30) Foreign Application Priority Data

Jul. 8, 1999 (JP) .............................. 11-194009
Feb. 16, 2000 (JP) ........................ 2000-037863

(51) Int. Cl.$^7$ ............................ H01M 4/36; H01M 4/24
(52) U.S. Cl. ................................. 429/218.2; 429/223
(58) Field of Search ......................... 429/218.2, 223; 420/900

(56) References Cited

U.S. PATENT DOCUMENTS 5,637,422 A    6/1997  Edamoto et al.
6,136,473 A  * 10/2000  Furukawa et al.

FOREIGN PATENT DOCUMENTS

| DE | 4004759 A1 | * | 9/1990 |
| EP | 0723305 |   | 7/1996 |
| EP | 0834945 |   | 8/1998 |
| JP | 50-036935 |   | 4/1975 |
| JP | 8-148145 |   | 6/1996 |
| JP | 9-073900 |   | 3/1997 |

OTHER PUBLICATIONS

European Search Report dated Aug. 11, 2000 for Application No. EP 00 11 2904.
Patent Abstract of Japan vol. 1996, No. 10, Oct. 31, 1996 & JP 08 148179 A (Matsushita Electric Ind Co Ltd), Jun. 7, 1996.

* cited by examiner

Primary Examiner—Carol Chaney
Assistant Examiner—Susy Tsang-Foster
(74) Attorney, Agent, or Firm—Steves, Davis, Miller & Mosher, LLP (57) ABSTRACT

A nickel-metal hydride secondary battery includes positive electrodes including nickel hydroxide, negative electrodes including a hydrogen-absorbing alloy, separators and an alkaline electrolyte. The positive electrode includes a compound silicate. By employing the above construction, the compound silicate reacts with Mn or Al which dissolves out from the negative electrode to inhibit deterioration of electrochemical characteristics of the battery, and thus the life of the battery can be prolonged.

8 Claims, 2 Drawing Sheets

NICKEL-METAL HYDRIDE SECONDARY BATTERY COMPRISING A COMPOUND SILICATE

BACKGROUND OF THE INVENTION

1. Field of the Invention

The present invention relates to a nickel-metal hydride secondary battery of long life which can be used for backup purpose and the like.

2. Description of Related Art

With the recent spread of portable devices, alkaline storage batteries are demanded to have higher capacity. Particularly, nickel-metal hydride secondary batteries which comprise positive electrodes having an active material mainly composed of nickel hydroxide and negative electrodes comprising a hydrogen-absorbing alloy as an active material have rapidly spread as secondary batteries of high capacity and high reliability. Furthermore, lead storage batteries or nickel-cadmium secondary batteries, which have hitherto been used for backup purpose, are now being replaced with nickel-metal hydride secondary batteries as a result of improvement in performance of nickel-metal hydride secondary batteries and from the recent view for the earth environment.

Conventional nickel-metal hydride secondary batteries will be explained below. For example, a cylindrical nickel-metal hydride secondary battery has such a structure as comprising a case in which a plate group formed by spirally rolling a positive electrode and a negative electrode with a separator interposed is inserted and an electrolyte is filled and which is sealed with a sealing plate.

Positive electrodes of nickel-metal hydride secondary batteries are roughly classified into sintered type and unsintered type. The former are prepared, for example, by sintering a nickel powder to obtain a porous nickel sintered substrate having a porosity of about 80%, impregnating the resulting porous substrate with a solution of a nickel salt such as aqueous nickel nitrate solution and then dipping the substrate in an aqueous alkali solution, thereby to produce a nickel hydroxide active material in the porous nickel sintered substrate.

The latter unsintered type positive electrodes are prepared by filling a three-dimensionally continuing spongy porous substrate comprising nickel metal and having a porosity of 95% or higher with nickel hydroxide as an active material as disclosed in JP-A-50-36935, and, at present, they are widely used as positive electrodes of nickel-metal hydride secondary batteries of high capacity.

As to this unsintered type positive electrode, it has been proposed to fill the porous substrate with spherical nickel hydroxide from the point of attainment of high capacity. According to this technique, pore size of the spongy porous substrate is about 200–500 $\mu$m, and the pores are filled with spherical nickel hydroxide having a particle size of several $\mu$m to several ten $\mu$m. In this unsintered type positive electrode, in order to improve utilization ratio of the filled nickel hydroxide, a conductive agent is used in addition to nickel hydroxide. The conductive agent electrically connects the spherical nickel hydroxide particles. Cobalt compounds such as cobalt hydroxide and cobalt monoxide, metallic cobalt, metallic nickel and others are used as the conductive agent.

Thus, it becomes possible to fill the active material at a high density and to connects the active material electrically in the unsintered type positive electrode. The capacity can be increased as compared with the sintered type positive electrode.

Furthermore, there is a demand in the market to provide high capacity secondary batteries which use unsintered type positive electrodes and are excellent in over discharge characteristics and further improved cycle characteristics. As a method for producing a positive electrode active material for high capacity nickel-metal hydride secondary batteries for meeting the above demand, JP-A-8-148145 discloses a method which comprises coating a cobalt compound on an active material of nickel hydroxide and subjecting the cobalt compound to an alkali oxidation treatment to convert to a higher order cobalt oxide. JP-A-9-73900 discloses an improvement of the above method.

According to these methods, the nickel hydroxide powder coated with the cobalt compound is sprayed with an aqueous alkali solution under fluidization or dispersion in the heated air. As a result, it has become possible to make nickel-metal hydride secondary batteries of high energy density which are improved in active material utilization and battery characteristics such as high rate discharge characteristics and overdischarge characteristics as compared with the conventional methods in which the cobalt compound is added as an external additive.

Negative electrodes of nickel-metal hydride secondary batteries comprise a plate prepared by coating a nickel-plated perforated steel sheet with an active material mainly composed of a hydrogen-absorbing alloy to which a carbon material is added to improve the surface reaction activity or yttrium oxide is added to improve oxidation resistance of the hydrogen-absorbing alloy.

The hydrogen-absorbing alloys used mainly for nickel-metal hydride secondary batteries are $AB_5$ alloys whose composition is generally shown by $LaNi_5$. $AB_5$ alloys, which are put to practical use, are $LaNi_5$ alloys in which La is replaced with Mm and Ni is replaced with Co, Mn and Al and are shown by $MmNi_aCo_bMn_cAl_d$.

The A site of the $AB_5$ alloys comprises Mm (a misch metal: a rare earth metal mainly composed of La) and the B site comprises Ni, Co, Mn and Al, and 1: a+b+c+d=1:5. Therefore, the alloys are called $AB_5$ alloys.

Depending on the composition of metals in the B site, corrosion resistance, hydrogen absorbing and releasing reaction rate and amount of absorbed hydrogen of the alloys can be changed, and various compositions are investigated.

Separators of nickel-metal hydride secondary batteries are mainly made of a nonwoven fabric comprising fibers of polypropylene or nylon. Separators must have such actions as physically separating the positive electrodes and the negative electrodes from each other and holding the electrolyte so that an electrochemical reaction takes place at the positive electrodes and the negative electrodes.

Polypropylene and nylon are hydrophobic for aqueous solution and have no function to hold the electrolyte. Therefore, separators of nickel-metal hydride secondary batteries are made hydrophilic by a surface treatment so as to hold the electrolyte in the batteries.

BRIEF SUMMARY OF THE INVENTION

When a hydrogen-absorbing alloy is used as the negative electrode material of nickel-metal hydride secondary batteries, Mn and Al dissolve into the electrolyte from the negative electrode during long-term charging and discharging or long-term storage. If Mn and Al dissolve into the electrolyte, characteristics of the battery are deteriorated.

Thus, a main object of the present invention is to provide a long-life nickel-metal hydride secondary battery usable for backup by reducing the amount of Mn and Al which dissolve into the electrolyte due to corrosion of the hydrogen-absorbing alloy, besides, passivating the dissolved Mn and Al to inhibit deterioration of the battery characteristics. Other objects of the present invention will be readily apparent from the description of the invention.

For attaining the above object, the present invention provides a nickel-metal hydride secondary battery comprising a positive electrode comprising nickel hydroxide, a negative electrode comprising a hydrogen absorbing alloy, a separator and an alkaline electrolyte, characterized in that the battery further comprises a compound silicate. "Compound silicate," as used herein, refers to a salt consisting essentially of a salt formed by silicate dioxide and a compound metal oxide comprising at least two metals.

By adding the compound silicate, the battery is inhibited from deterioration in electrochemical characteristics and, as a result, the life of the battery can be prolonged.

DETAILED DESCRIPTION OF THE INVENTION

The present invention provides a nickel-metal hydride secondary battery comprising a positive electrode comprising nickel hydroxide, a negative electrode comprising a hydrogen-absorbing alloy, a separator and an alkaline electrolyte, characterized in that the battery further comprises a compound silicate.

The compound silicate is a salt consisting essentially of a salt formed by silicate dioxide and a compound metal oxide comprising at least two metals. The compound metal oxide preferably comprises at least two metals selected from the group consisting of Be, Mg, Ca, Zn, Sr, Ba and Ra. Be, Mg, Ca, Ra, Sr, and Ba are alkaline earth metals, listed in Group II in the Periodic Table. More preferably, the compound metal oxide comprises Mg and Ca. The compound silicate represented by the formula of $Mg_{4(1-x)}Ca_{4x}Si_6O_{15}(OH)_2$ (wherein x is 0<x<1) such as $Mg_{2.7}Ca_{1.3}Si_6O_{15}(OH)_2$ is most preferable.

The compound silicate is preferably added to at least one selected from the group consisting of the positive electrode, the negative electrode and the separator. Specifically, the compound silicate is added to the positive electrode; the negative electrode; the separator; the positive electrode and the negative electrode; the positive electrode and the separator; the negative electrode and the separator; or the positive electrode, the negative electrode and the separator. However, it does not prohibit the addition to the electrolyte.

Amount of the compound silicate added to the positive electrode is preferably 0.1–5% by weight based on the nickel hydroxide, amount added to the negative electrode is preferably 0.1–3% by weight based on the hydrogen-absorbing alloy, amount added to the separator is preferably 0.1–10% by weight based on the separator in dry state. If the compound silicate is added to plural parts of the battery, the amount can be adjusted. For example, the compound silicate are added to the positive electrode, the negative electrode and the separator, amount of the compound silicate added to the positive electrode is preferably 0.05–2% by weight based on the nickel hydroxide, amount added to the negative electrode is preferably 0.05–1.5% by weight based on the hydrogen-absorbing alloy, amount added to the separator is preferably 0.05–3% by weight based on the separator in dry state.

It is difficult to elucidate the mechanism which will results in the effects, but it can be presumed as follows. However, this presumption does not limit the scope of the invention.

When a nickel-metal hydride battery is kept at high temperatures, the hydrogen-absorbing alloy of the negative electrode is corroded and metals such as Al dissolve. Metals dissolved reacts with a conductive agent of the positive electrode such as cobalt hydroxide. Accordingly, the conductivity of the positive electrode decreases and causes the decrease of the utilization ratio of the positive electrode. When the compound silicate is added to the positive electrode, the metals contained in the compound silicate are apt to produce preferentially a compound oxide with the metals dissolved from the negative electrode. As a result, decrease of conductivity due to the reaction between the metal dissolved and the conductive agent is inhibited and the characteristics of the battery are not deteriorated. Accordingly, the present invention is more effective when the hydrogen-absorbing alloy contains a metal which dissolves by corrosion and the positive electrode contains the conductive agent which decreases the conductivity by the reaction with the metal such as cobalt hydroxide.

Further, the corrosion of the negative electrode mentioned above is considered depending on the concentration of carbonate ion which comes from such as a separator. When the compound silicate is added to the negative electrode, the carbonate ion reacts with the metals in the compound silicate and precipitates as a metal salt, and the concentration of the carbonate ion decreases. According to the above, the corrosion of the hydrogen absorbing alloy is prohibited and the deterioration of the battery characteristics is prevented. Accordingly, the present invention is more effective when the electrolyte contains the carbonate ion.

The compound silicate is present such as hydroxide ion in the electrolyte. When the compound silicate is added to the separator, the hydroxide ion is absorbed to the surface of the separator and improves the hydrophilic property and maintains the ion conductivity and prevents the deterioration of the battery characteristics.

According to the present invention, the battery may further comprise a material for increasing an oxygen evolution potential. The material is well known to a person skilled in this art. The material is not restricted, however, yttrium oxide, ytterbium oxide or lutetium oxide is preferred.

By addition of the material to the positive electrode, the generation of oxygen from the positive electrode caused by overcharging is inhibited, and the deterioration of the battery characteristics is inhibited.

The material may be added to the negative electrode. It is difficult to elucidate the mechanism why the addition to the negative electrode will results in the effects, but it can be presumed as follows. However, this presumption does not limit the scope of the invention.

Oxygen generated from the positive electrode dissolves in the electrolyte and reaches the surface of the negative electrode. The oxygen reacts with hydrogen stored in the hydrogen-absorbing alloy and is reduced to produce water, but simultaneously there also takes place a reaction of oxidizing the hydrogen-absorbing alloy per se.

The material such as ytterbium oxide partially dissolves in an alkali solution as a hydroxide or an ion coordinated with a hydroxyl group. These hydroxide and hydroxide ion reacts with oxygen, and the oxygen is once absorbed. It is considered that because of this oxygen absorbing reaction, the oxidizing reaction of the alloy is prevented.

Accordingly, in the present invention, the compound silicate is added to the positive electrode; the negative electrode; the separator; the positive electrode and the negative electrode; the positive electrode and the separator; the negative electrode and the separator; or the positive electrode, the negative electrode and the separator as stated above, and further in each case of the above the material for increasing an oxygen evolution potential may be added to the positive electrode; the negative electrode; or the positive electrode and the negative electrode.

Amount of the material added to the positive electrode is preferably 0.1–2.5% by weight based on the nickel hydroxide, amount added to the negative electrode is preferably 0.1–2.5% by weight based on the hydrogen-absorbing alloy. If the material is added to plural parts of the battery, the amount can be adjusted. For example, the material is added to the positive electrode and the negative electrode and the separator, amount of the material added to the positive electrode is preferably 0.1–2.5% by weight based on the nickel hydroxide, amount added to the negative electrode is preferably 0.05–1.25% by weight based on the hydrogen-absorbing alloy.

The active material of the positive electrode may contain at least one element selected from the group consisting of cobalt, zinc, manganese, calcium, chromium, aluminum, iron and magnesium to form a solid solution. The amount of the elements can be within the range of 1–10 mol %.

The positive electrode may contain a conductive agent. As the agent, cobalt hydroxide and cobalt oxide may be used each alone or in admixture of them or cobalt may be coated on nickel hydroxide.

Having thus generally described the present invention, the following examples are provided to illustrate the invention. The examples are not intended to limit to the scope of the invention.

EXAMPLES

Example 1
Addition of Compound Silicate to Positive Electrode

300 Grams of spherical nickel hydroxide powders of 10 $\mu$m in average particle size in which cobalt and zinc were dissolved to form a solid solution, 30 g of cobalt hydroxide powders of 0.2 $\mu$m in average particle size and 3 g of $Mg_{2.7}Ca_{1.3}Si_6O_{15}(OH)_2$ as a compound silicate were mixed with 100 g of water. Amount of cobalt and that of zinc dissolved in the nickel hydroxide active material were 2 mol % and 6 mol %, respectively.

The mixture was subjected to mechanical mixing to prepare a paste. A foamed metal was filled with the paste, dried and rolled to make a positive electrode plate. Thickness of the positive electrode plate after rolled was about 750 $\mu$m. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE and water was coated on a perforated substrate plated with nickel, followed by drying the paste and rolling the electrode plate to make a negative electrode. Thickness of this electrode after rolled was 420 $\mu$m. The theoretical capacity of this electrode was 1700 mAh.

A nonwoven fabric made of polypropylene was used as a separator. Thickness of this separator was 180 $\mu$m.

The positive electrode, the separator, the negative electrode and the separator were disposed in this order, and were rolled in spiral form, followed by inserting them in a battery case of AA size and filling the case with a given amount of an alkaline electrolyte. Thereafter, the case was sealed with a sealing plate to make a nickel-metal hydride secondary battery A of Example 1 of the present invention.

A battery X of comparative example was made in the same manner as in making the battery A of Example 1, except that the compound silicate was not added to the positive electrode.

These batteries were charged at 100 mA for 15 hours and left to stand for 1 hour, and thereafter were discharged at 200 mA until the discharge voltage reached 1 V. This cycle was repeated thrice. The utilization ratio (the ratio of actual discharge capacity/theoretical capacity of positive electrode which was shown in percentage) obtained from the discharge capacity at the third cycle was 100%.

A long-term life evaluation generally includes the cycle life evaluation and the thermal acceleration evaluation which comprises heating a battery, storing the battery for a given period of time and measuring the capacity.

The cycle life evaluation is a method of evaluating the phenomenon that positive electrode or negative electrode expands and contracts due to the repetition of charging and discharging and physically lowers its function and the phenomenon that the positive electrode active material absorbs water in the electrolyte due to the increase of overcharge caused by overcharging or reduction of discharging efficiency, resulting in increase of internal resistance of the battery and deterioration of the capacity.

The thermal acceleration evaluation is a method of carrying out the life evaluation in a short period of time by application of heat utilizing the cycle characteristics and utilizing the fact that the deterioration of various materials, nickel hydroxide, hydrogen-absorbing alloy and separator caused by a chemical reaction.

The evaluation was conducted in a temperature atmosphere of 25–80° C.

(Experiment 1)

The experiment was conducted in a thermostat of 80° C. When a nickel-metal hydride secondary battery is put at high temperatures, its capacity decreases. This is mainly because self discharge occurs owing to self degradation of the positive electrode. The positive electrode active material in charged state is an oxide of higher nickel valence. Moreover, in an aqueous solution type battery such as nickel-metal hydride secondary battery, electrolysis of water takes place to generate oxygen gas and hydrogen gas. These oxygen gas and hydrogen gases are more readily generated with increase of temperature. Therefore, when a battery is placed at high temperatures, oxygen evolution potential becomes lower than the potential of positive electrode, and, hence, the positive electrode self degrades by generating oxygen and is reduced. That is, discharge capacity as a battery decreases.

Batteries used for backup purpose are kept at nearly fully charged state. Thus, in this experiment 1, the battery was repeatedly subjected to charging, suspending, charging, and the battery was charged in an electric quantity corresponding to the electric quantity self discharged during the suspension, and stored in such a state that the battery was not in completely discharged state.

A storing period was set, and the battery was disassembled and amount of Al in the positive electrode was measured by chemical analytical method. Further, capacity recovery rate of the battery was measured.

The capacity recovery rate of the battery is ratio of the battery capacity before the storage test and the battery capacity after the storage test, which is shown in percentage.

The battery capacity test was conducted by charging at 1000 mA for 1.2 hour, suspending for 1 hour and discharging at 1000 mA, and measuring the capacity until the battery voltage reached 1.0 V upon discharging.

Figure 1:
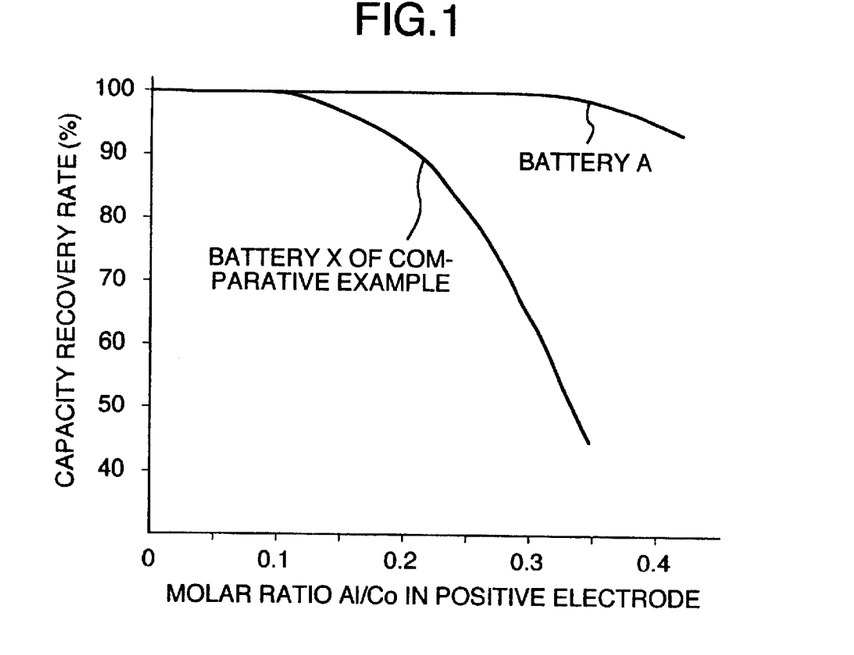
FIG. 1 is a graph which shows a relation between the molar ratio of Al/Co in the positive electrode and the capacity recovery rate of the battery.

FIG. 1 shows a relation between the battery capacity recovery rate and the molar ratio Al/Co in the positive electrode of the battery A of Example 1 and the battery X of the comparative example.

As shown in FIG. 1, the capacity recovery rate decreased with increase of the amount of Al in the positive electrode. The increase of the amount of Al depended on the storage period. It can be seen that in the case of the battery X of the comparative example, the capacity recovery rate decreased with increase of the amount of Al in the positive electrode while in the case of the battery A of Example 1, decrease of the capacity recovery rate was inhibited.

As shown above, even when the battery was stored for a long period of time in charged state, deterioration of the battery characteristics could be inhibited by adding the compound silicate to the positive electrode.

As aforementioned, when a nickel-metal hydride secondary battery is kept at high temperatures, the hydrogen-absorbing alloy of the negative electrode is corroded and the battery characteristics are deteriorated. It is presumed as follows. Al dissolving out from the hydrogen-absorbing alloy reacts with Co used as a conductive agent of the positive electrode. When Co reacts with Al, conductivity of Co decreases to cause decrease of utilization ratio of the positive electrode. Ca and Mg comprised in the compound silicate are alkaline earth metals and are apt to produce preferentially a compound oxide with Al. As a result, decrease of conductivity due to the reaction between Al and Co is inhibited and characteristics of the battery are not so much deteriorated.

Example 2
Addition of Compound Silicate and Material for Increasing an Oxygen Evolution Potential to Positive Electrode 300 Grams of spherical nickel hydroxide powders of 10 $\mu$m in average particle size in which cobalt and zinc were dissolved to form a solid solution, 30 g of cobalt hydroxide powders of 0.2 $\mu$m in average particle size, 1.5 g of $Mg_{2.7}Ca_{1.3}Si_6O_{15}(OH)_2$ as a compound silicate and 1.5 g of ytterbium oxide were mixed with 100 g of water. Amount of cobalt and that of zinc dissolved in the nickel hydroxide active material to form a solid solution were 2 mol % and 6 mol %, respectively.

The mixture was subjected to mechanical mixing to prepare a paste. A foamed metal was filled with the paste, dried and rolled to make a positive electrode plate. Thickness of the positive electrode plate after rolled was about 750 $\mu$m. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE and water was coated on a perforated substrate plated with nickel, followed by drying the paste and rolling the electrode plate to make a negative electrode. Thickness of this electrode after rolled was 420 $\mu$m. The theoretical capacity of this electrode was 1700 mAh.

A nonwoven fabric made of polypropylene was used as a separator. Thickness of this separator was 180 $\mu$m.

The positive electrode, the separator, the negative electrode and the separator were disposed in this order, and were rolled in spiral form, followed by inserting them in a battery case of AA size and filling the case with a given amount of an alkaline electrolyte. Thereafter, the case was sealed with a sealing plate to make a nickel-metal hydride secondary battery B of Example 2 of the present invention.

The battery was charged at 100 mA for 15 hours and left to stand for 1 hour, and thereafter was discharged at 200 mA until the discharge voltage reached 1 V. This cycle was repeated thrice. The utilization ratio (the ratio of actual discharge capacity/theoretical capacity of positive electrode which was shown in percentage) obtained from the discharge capacity at the third cycle was 100%.

As a battery of comparative example, the battery X made in Example 1 was prepared.

(Experiment 2)

As aforementioned, in an aqueous solution type battery such as nickel-metal hydride secondary battery, electrolysis of water occurs at the time of charging and generates oxygen from the positive electrode and hydrogen gas from the negative electrode.

Generally, in nickel-metal hydride secondary batteries, the charging electrical quantity and the discharging electrical quantity are nearly proportioned to each other, but when they are in nearly fully charged state, there occurs a phenomenon that efficiency of charging is reduced. This is because when the positive electrode is charged, potential of the positive electrode increases and finally reaches oxygen evolution potential, and, hence, a part of the charging current is consumed by the electrolysis of water.

Therefore, in order to charge the nickel-metal hydride secondary battery completely, charging of 1.2–1.5 times the battery capacity is needed.

For the backup use, nearly fully charged state must be maintained and, thus, overcharging is repeated.

The experiment was conducted in the following manner. First, the battery B and the comparative battery X were charged at 100 mA for 15 hours at 25° C. so as to reach full charge. The batteries were put in a thermostat of 55° C. and repeatedly charged and discharged. The charging was carried out at 100 mA for 12 minutes and the discharging was carried out at 100 mA for 6 minutes.

The above cycle was repeated about 6000 times, and capacity recovery rate of the batteries was measured. Moreover, the battery was disassembled and amount of Al in the positive electrode was measured by chemical analytical method.

Ratio of the battery capacity before the storage test and the battery capacity after the storage test is shown in percentage, and this is taken as the capacity recovery rate of the battery.

The battery capacity test was conducted by charging at 1000 mA for 1.2 hour, suspending for 1 hour and discharging at 1000 mA, and measuring the capacity until the battery voltage reached 1.0 V.

The capacity recovery rate of the battery B was 99% and that of the battery X of the comparative example was 71%.

Amount of Al in the positive electrode in the battery B was 0.20 in terms of the molar ratio Al/Co, and that in the battery X was 0.28.

It is considered that generation of oxygen from the positive electrode caused by overcharging was inhibited by adding ytterbium oxide and the compound silicate to the positive electrode to diminish corrosion of the negative electrode, and, simultaneously, the compound silicate reacted with Al to passivate Al and thus the capacity recovery rate increased.

Example 3
Addition of Compound Silicate to Negative Electrode

300 Grams of spherical nickel hydroxide powders of 10 μm in average particle size in which cobalt and zinc were dissolved to form a solid solution and 30 g of cobalt hydroxide powders of 0.2 μm in average particle size were mixed with 100 g of water.

Amount of cobalt and that of zinc dissolved in the nickel hydroxide active material to form a solid solution were 2 mol % and 6 mol %, respectively.

The mixture was subjected to mechanical mixing to prepare a paste. A foamed metal was filled with the paste, dried and rolled to make a positive electrode plate. Thickness of the positive electrode plate after rolled was about 750 μm. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE, 1% by weight of $Mg_{2.7}Ca_{1.3}Si_6O_{15}(OH)_2$ as a compound silicate and water was coated on a perforated substrate plated with nickel, followed by drying the paste and rolling the electrode plate to make a negative electrode. Thickness of this electrode after rolled was 420 μm. The theoretical capacity of this electrode was 1700 mAh.

A nonwoven fabric made of polypropylene subjected to sulfonation treatment was used as a separator. Thickness of this separator was 180 μm.

A nickel-metal hydride secondary battery C of AA size according to the present invention was made in the same manner as in making the battery of Example 1, except that the positive electrode, negative electrode and separator prepared in this Example 3 were used.

The battery was charged at 100 mA for 15 hours and left to stand for 1 hour, and thereafter discharged at 200 mA until the discharge voltage reached 1 V. This cycle was repeated thrice. The utilization ratio (the ratio of actual discharge capacity/theoretical capacity of positive electrode which was shown in percentage) obtained from the discharge capacity at the third cycle was 100%.

As a battery of comparative example, the battery X made in Example 1 was used.

(Experiment 3)

The experimental method was the same as of the above experiment 1.

Figure 2:
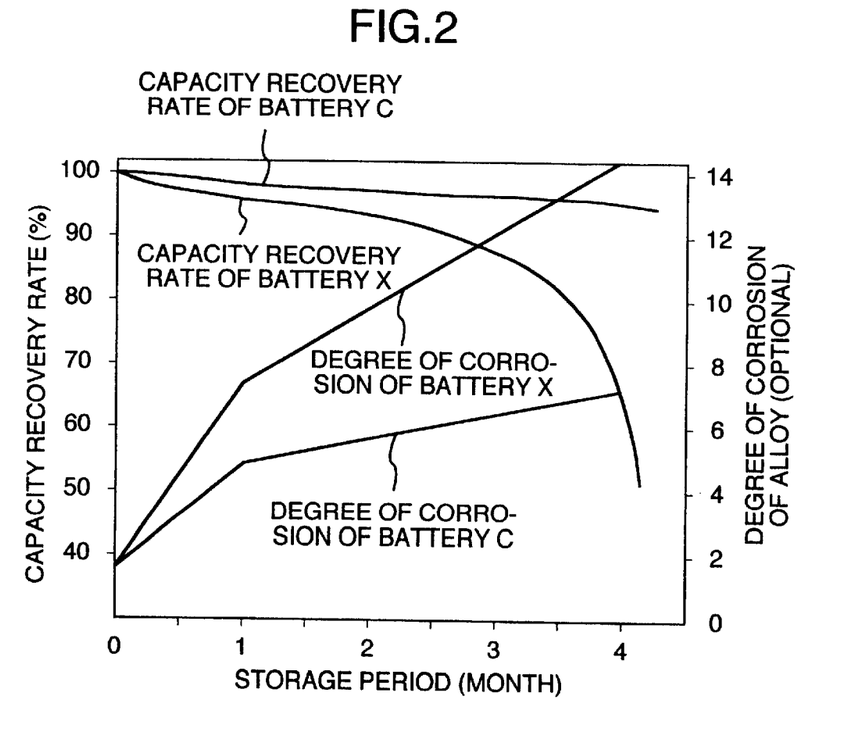
FIG. 2 is a graph which shows relations between the storage period of the battery and the capacity recovery rate of the battery and the degree of corrosion of the alloy.

FIG. 2 shows relations between the storage period of the batteries and the degree of corrosion of the hydrogen-absorbing alloy used in the batteries and the capacity recovery rate of the batteries.

The hydrogen-absorbing alloy is an alloy mainly composed of Mm and Ni. When the hydrogen-absorbing alloy is corroded, La in Mm and Mn and Al substituted for Ce and Ni become hydroxides. In this case, Ni in the hydrogen-absorbing alloy is hardly oxidized and precipitated as Ni metal on the surface of the hydrogen-absorbing alloy. Ni is not a magnetic substance when it is alloyed, but is a ferromagnetic substance when it is in metallic state. Therefore, amount of Ni can be obtained by measuring a magnetic susceptibility, and degree of corrosion of the alloy can be known from the amount of Ni. Thus, the degree of corrosion of the alloy was determined from the amount obtained by measuring the magnetic susceptibility.

The method for measurement of the capacity recovery rate of the battery was the same as in experiment 1, namely, capacity of the battery before left to stand was measured and this was assumed to be 100%, and capacities of the battery after left to stand for given periods were measured and expressed based on the capacity (100%) before left to stand.

The degree of corrosion of the hydrogen-absorbing alloy in the battery C of Example 3 after stored for 4 months in an atmosphere of 80° C. was less than 50% of the degree of corrosion in the battery X of comparative example. Moreover, the capacity recovery rate of the battery C of Example 3 after stored for 4 months in an atmosphere of 80° C. was higher at least 30% than that of the battery X of comparative example.

As shown in this Example 3, even when the nickel-metal hydride secondary battery was stored for a long period of time, deterioration of the battery characteristics can be inhibited by adding the compound silicate to the negative electrode.

It is considered that this is because corrosion of the negative electrode depends on concentration of carbonate ion and concentration of oxygen in the electrolyte. The carbonate ion is produced mainly because polymer materials used as binders for active materials or resin materials used as separators or insulating sheets decompose little by little with lapse of time and dissolve in the electrolyte. The carbonate ion produces a carbonation product with a rare earth element in the hydrogen-absorbing alloy to accelerate corrosion of alloy.

It has been mentioned before that a positive electrode self degrades to generate oxygen though it depends on temperatures. Oxygen generated from the positive electrode dissolves in the electrolyte and reaches the surface of the negative electrode. The oxygen reacts with hydrogen stored in the hydrogen-absorbing alloy and is reduced to produce water, but simultaneously there also takes place a reaction of oxidizing the hydrogen-absorbing alloy per se.

In the present invention, by adding a compound silicate to the negative electrode, the carbonate ion reacts with an alkali earth metal such as Ca and Mg in the compound silicate to precipitate $CaCO_3$ and $MgCO_3$ to reduce the carbonate ion concentration. It is considered that this action inhibits corrosion of the alloy.

Furthermore, Ca, Mg and Si partially dissolve in an alkali solution as a hydroxide or an ion coordinated with a hydroxyl group.

These hydroxide and hydroxide ion do not change in valence of cations (Ca, Mg and Si here), and hydroxide and oxide exist in Equilibrium State with the presence of oxygen. Therefore, oxygen which migrates from the positive electrode reacts with these hydroxide and hydroxide ion, and oxygen is once absorbed. It is considered that because of this oxygen absorbing reaction, the reaction rate of reduction of oxygen with hydrogen in the hydrogen-absorbing alloy becomes slow, thereby to inhibit proceeding of corrosion of the negative electrode and to inhibit oxidizing the alloy.

Though not fully elucidated, it is considered that for the above reasons, decrease of capacity recovery rate caused by storage can be inhibited in the case of the battery B of Example 3.

Example 4
Addition of Compound Silicate and a Material for Increasing an Oxygen Evolution Potential to Negative Electrode 300 Grams of spherical nickel hydroxide powders of 10 μm in average particle size in which cobalt and zinc were dissolved to form a solid solution and 30 g of cobalt hydroxide powders of 0.2 μm in average particle size were mixed with 100 g of water.

Amount of cobalt and that of zinc dissolved in the nickel hydroxide active material to form a solid solution were 2 mol % and 6 mol %, respectively.

The mixture was subjected to mechanical mixing to prepare a paste. A foamed metal was filled with the paste, dried and rolled to make a positive electrode plate. Thickness of the positive electrode plate after rolled was about 750 μm. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE, 0.5% by weight of $Mg_{2.7}Ca_{1.3}Si_6O_{15}(OH)_2$ as a compound silicate, 0.5% by weight of ytterbium oxide and water was coated on a perforated substrate plated with nickel, followed by drying the paste and rolling the electrode plate to make a negative electrode. Thickness of this electrode after rolled was 420 μm. The theoretical capacity of this electrode was 1700 mAh.

A nonwoven fabric made of polypropylene subjected to sulfonation treatment was used as a separator. Thickness of this separator was 180 μm.

A nickel-metal hydride secondary battery D of AA size of the present invention was made in the same manner as in making the battery of Example 1, except that the positive electrode, negative electrode and separator prepared in this Example 4 were used.

The battery was charged at 100 mA for 15 hours and left to stand for 1 hour, and thereafter discharged at 200 mA until the discharge voltage reached 1 V. This cycle was repeated thrice. The utilization ratio (the ratio of actual discharge capacity/theoretical capacity of positive electrode which was shown in percentage) obtained from the discharge capacity at the third cycle was 100%.

As a battery of comparative example, the battery X made in Example 1 was used.

(Experiment 4)

The experimental method was the same as of the above experiment 1.

The hydrogen-absorbing alloy is an alloy mainly composed of Mm and Ni. When the hydrogen-absorbing alloy is corroded, La in Mm and Mn and Al substituted for Ce and Ni become hydroxides. In this case, Ni in the hydrogen-absorbing alloy is hardly oxidized and precipitated as Ni metal on the surface of the hydrogen-absorbing alloy. Ni is not a magnetic substance when it is alloyed, but is a ferromagnetic substance when it is in metallic state. Therefore, amount of Ni can be obtained by measuring a magnetic susceptibility, and degree of corrosion of the alloy can be known from the amount of Ni. Thus, the degree of corrosion of the alloy was determined from the amount obtained by measuring the magnetic susceptibility.

The method for measurement of the capacity recovery rate of the battery was the same as in experiment 1, namely, capacity of the battery before left to stand was measured and this was assumed to be 100%, and capacities of the battery after left to stand for given periods were measured and expressed based on the capacity (100%) before left to stand.

The degree of corrosion of the hydrogen-absorbing alloy in the battery D of Example 4 after stored for 4 months in an atmosphere of 80° C. was less than 45% of the degree of corrosion in the battery X of comparative example. Moreover, the capacity recovery rate of the battery D after stored for 4 months in an atmosphere of 80° C. was higher at least 30% than that of the battery X of comparative example.

As shown in this Example 4, even when the nickel-metal hydride secondary battery was stored for a long period of time, deterioration of the battery characteristics could be inhibited by adding the compound silicate and ytterbium oxide to the negative electrode.

It is considered that this is because corrosion of the negative electrode depends on concentration of carbonate ion and concentration of oxygen in the electrolyte. The carbonate ion is produced mainly because polymer materials used as binders for active materials or resin materials used as separators or insulating sheets decompose little by little with lapse of time and dissolve into the electrolyte. The carbonate ion produces a carbonation product with a rare earth element in the hydrogen-absorbing alloy to accelerate corrosion of the alloy.

It has been mentioned before that a positive electrode self degrades to generate oxygen though it depends on temperatures. Oxygen generated from the positive electrode dissolves in the electrolyte and reaches the surface of the negative electrode. The oxygen reacts with hydrogen stored in the hydrogen-absorbing alloy and is reduced to produce water, but simultaneously there also takes place a reaction of oxidizing the hydrogen-absorbing alloy per se.

The effect of the compound silicate is as mentioned in Example 3.

Ytterbium oxide partially dissolves in an alkali solution as a hydroxide or an ion coordinated with a hydroxyl group.

These hydroxide and hydroxide ion do not change in valence of cation (Yb here), and the hydroxide and the oxide exist in Equilibrium State with the presence of oxygen. Therefore, oxygen which migrates from the positive electrode reacts with the hydroxide or hydroxide ion. It is considered that because of this reaction, the reaction rate of reduction of oxygen with hydrogen in the hydrogen-absorbing alloy becomes slow, thereby to prevent proceeding of corrosion of the negative electrode and to prevent oxidizing the alloy.

Though not fully elucidated, it is considered that for the above reasons, decrease of capacity recovery rate caused by storage can be inhibited in the case of the battery D of Example 4.

Example 5

Addition of Compound Silicate to Separator

300 Grams of spherical nickel hydroxide powders of 10 μm in average particle size in which cobalt and zinc were dissolved to form a solid solution and 30 g of cobalt hydroxide powders of 0.2 μm in average particle size were mixed with 100 g of water.

Amount of cobalt and that of zinc dissolved in the nickel hydroxide active material to form a solid solution were 2 mol % and 6 mol %, respectively. The mixture was subjected to mechanical mixing to prepare a paste. A foamed metal was filled with the paste, dried and rolled to make a positive electrode plate. Thickness of the positive electrode plate after rolled was about 750 μm. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE and water was coated on a perforated substrate plated with nickel, followed by drying the paste and rolling the electrode plate to make a negative electrode. Thickness of this electrode after rolled was 420 μm. The theoretical capacity of this electrode was 1700 mAh.

A nonwoven fabric made of polypropylene subjected to sulfonation treatment was used as a separator. Thickness of this separator was 180 μm. An aqueous solution was prepared by dispersing $Mg_{2.7}Ca_{1.3}Si_6O_{15}(OH)_2$ as a compound silicate in pure water. The separator was dipped in this aqueous solution to disperse the compound silicate in the separator. This separator was dried and was used as a separator of the battery. Amount of the compound silicate was 1% by weight based on the weight of the separator in dry state.

A nickel-metal hydride secondary battery E of AA size of the present invention was made in the same manner as in making the battery of Example 1, except that the positive electrode, negative electrode and separator prepared in this Example 5 were used. As a battery of comparative example, the battery X made in Example 1 was used.

The batteries were charged at 100 mA for 15 hours and left to stand for 1 hour, and thereafter discharged at 200 mA until the discharge voltage reached 1 V. This cycle was repeated thrice. The utilization ratio (the ratio of actual discharge capacity/theoretical capacity of positive electrode which was shown in percentage) obtained from the discharge capacity at the third cycle was 100%.

(Experiment 5)

A battery used for backup use must be always kept in charged state with continuously passing a very small current. In general, when a battery is subjected to continuous overcharging at low temperatures, there occurs the phenomenon that the positive electrode active material is converted to γ-type nickel oxyhydroxide, which entraps the electrolyte into the active material to cause exhaustion of the electrolyte in the separator, resulting in increase of internal resistance of the battery and decrease of capacity.

Therefore, the experiment was conducted by placing the battery E of Example 5 and the battery X of comparative example in a thermostat having an atmosphere of 0° C.

The batteries were continuously charged at a charging current of 50 mA, and subjected to capacity test at intervals of a given period. Simultaneously, internal resistance was measured at 1000 Hz by four terminal alternating current method. The capacity recovery rate was a ratio of battery capacity before the continuous charging and battery capacity after the continuous charging which was shown in percentage.

The battery capacity test was conducted by charging at 1000 mA for 1.2 hours and leaving the battery or 1 hour, and thereafter discharging at 1000 mA and measuring the capacity until the battery voltage reached 1.0 V.

Figure 3:
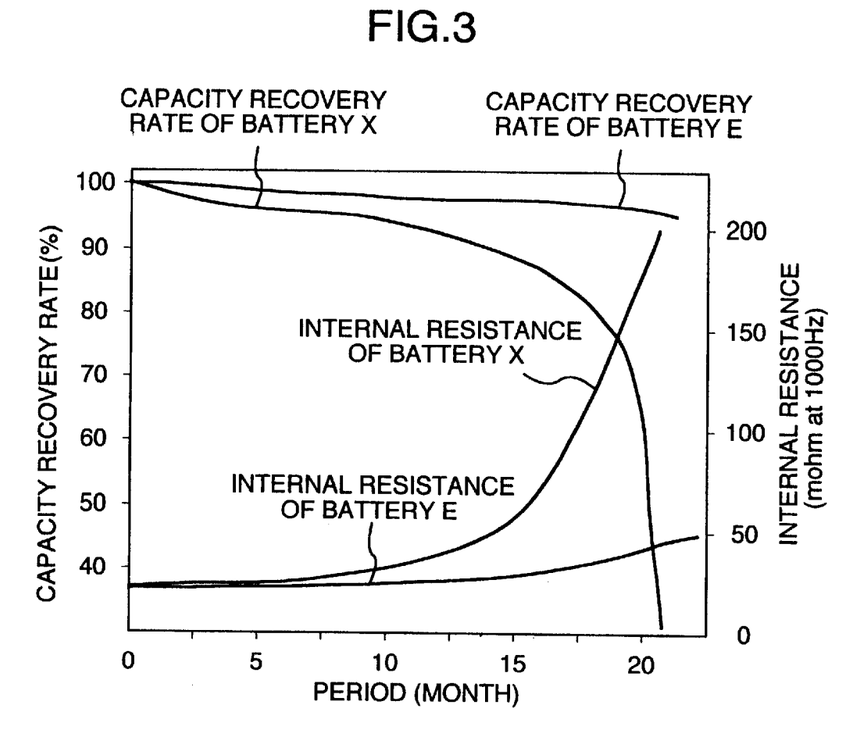
FIG. 3 is a graph which shows relations between the storage period of the battery and the capacity recovery rate of the battery and the internal resistance of the battery.

As shown in FIG. 3, the internal resistance increased and the capacity recovery rate decreased with increase of the charging period. In the case of battery X of comparative example, the internal resistance began to increase at about 10 months of the charging period, and thereafter abruptly increased and the capacity recovery rate abruptly decreased. On the other hand, in the case of battery E of this Example 5, the internal resistance hardly increased and the capacity recovery rate was good, namely, higher than 95% even after 20 months.

The above is considered to be due to the effect of dispersing the compound silicate in the separator. It is difficult to elucidate the detailed mechanism by the present analytical technique, but it can be presumed as follows. The compound silicate is present as a hydroxide or a hydroxide ion in the electrolyte. In an aqueous solution, the hydroxide is generally in the form of a cation in which water or hydroxyl group is coordinated. In the battery E of the present invention, the compound silicate is comprised in the separator, and, hence, the hydroxide is adsorbed to the surface of the fiber of the separator results in the improvement of hydrophilic properties of the separator. Furthermore, ionic conductivity was maintained by water coordinated in the adsorbed hydroxide. For this reason, although the internal resistance increased since the electrolyte in the separator was exhausted in the battery X of comparative example, this phenomenon was inhibited in the battery E. Hence, the continuous overcharging characteristics of the battery E at low temperatures were improved.

Example 6

Addition of Compound Silicate and Material for Increasing Oxygen Evolution Potential to Positive Electrode and Negative Electrode, and Addition of Compound Silicate to Separator 300 Grams of spherical nickel hydroxide powders of 10 μm in average particle size in which cobalt and zinc were dissolved to form a solid solution, 30 g of cobalt hydroxide powders of 0.2 μm in average particle size, 1.5 g of $Mg_{2.7}Ca_{1.3}Si_6O_{15}(OH)_2$ as a compound silicate, and 1.5 g of yttrium oxide were mixed with 100 g of water. Amount of cobalt and that of zinc dissolved in the nickel hydroxide active material to form a solid solution were 2 mol % and 6 mol %, respectively.

The mixture was subjected to mechanical mixing to prepare a paste. A foamed metal was filled with the paste, dried and rolled to make a positive electrode plate. Thickness of the positive electrode plate after rolled was about 750 μm. The theoretical capacity of this electrode (calculated on the basis of 289 mAh/g obtained assuming that nickel hydroxide performs one electron reaction) was 1000 mAh.

Then, a paste prepared by mixing a hydrogen-absorbing alloy of $AB_5$ type, 1% by weight of a carbon material, 1% by weight of PTFE, 0.5% by weight of $Mg_{2.7}Ca_{1.3}Si_6O_{15}(OH)_2$ as a compound silicate, 0.5% by weight of yttrium oxide and water was coated on a perforated substrate plated with nickel, followed by drying the paste and rolling the electrode plate to make a negative electrode. Thickness of this electrode after rolled was 420 μm. The theoretical capacity of this electrode was 1700 mAh.

A nonwoven fabric made of polypropylene subjected to sulfonation treatment was used as a separator. Thickness of this separator was 180 μm. An aqueous solution was prepared by dispersing $Mg_{2.7}Ca_{1.3}Si_6O_{15}(OH)_2$ as a compound silicate in pure water. The separator was dipped in this aqueous solution to disperse the compound silicate in the separator. This separator was dried and was used as a separator of the battery. Amount of the compound silicate was 1% by weight based on 100 of the separator in dry state.

A nickel-metal hydride secondary battery F of the present invention was made in the same manner as in making the battery of Example 1, except that the positive electrode, negative electrode and separator prepared in this Example 6 were used. As a battery of comparative example, the battery X made in Example 1, namely, made without adding the compound silicate to the positive electrode, negative electrode and separator, was used.

(Experiment 6)

The experiment was conducted by placing the battery F and the battery X of comparative example in a thermostat having an atmosphere of 80° C.

Charging, suspending and charging were repeated in the same manner as in experiment 1, and charging was carried out in correspondence to the electric quantity which was self discharged during the suspending, and the batteries were stored so that they were not in completely discharged state.

After the batteries were stored for 4 months, self discharge rate was measured. The self discharge rate here was obtained by keeping the batteries in fully charged state at a given temperature for a given period of time and measuring change of the voltage. The higher self discharge rate means that the capacity decreases only by leaving the battery, and this battery is not good.

The phenomenon of increasing of the self discharge rate occurs because the components which dissolve out from the positive electrode or the negative electrode over a long period of time, for example, Co and Mn, are precipitated in the separator to give electronic conductivity to the separator, and, hence, a conductive path was formed between the positive electrode and the negative electrode.

Figure 4:
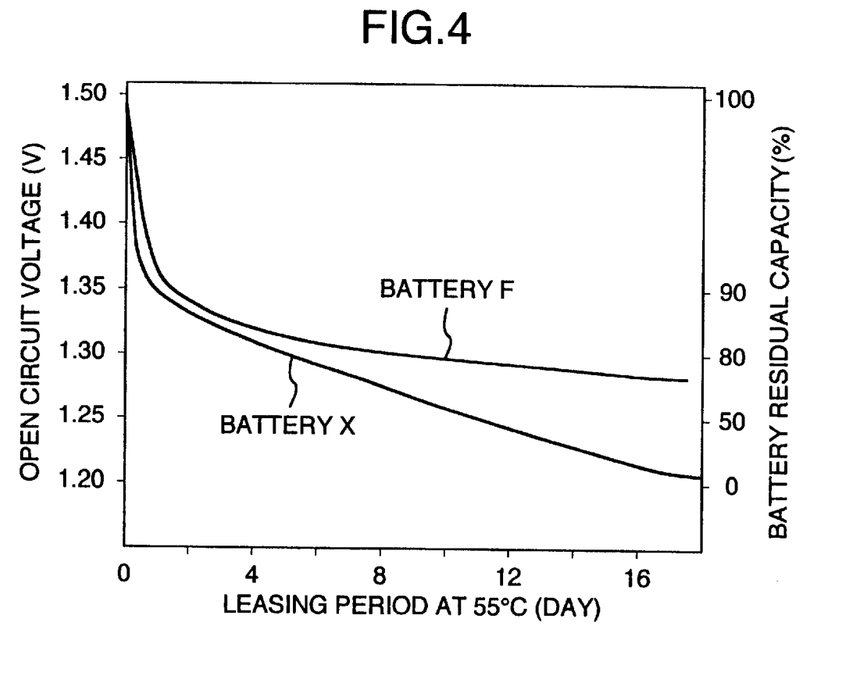
FIG. 4 is a graph which shows relations between the leaving time of the battery at 55° C. and the open circuit voltage and the residual capacity of the battery.

FIG. 4 shows the self discharge rate of the battery after stored for 4 months. The left y-axis shows open circuit voltage of the battery during discharge and the right y-axis shows residual capacity of the battery corresponding to the open circuit voltage. The open circuit voltage and the residual capacity of the battery were not in proportion to each other, but were nearly in the corresponding relation as shown in FIG. 4.

The experiment was conducted in an atmosphere of 55° C. for accelerated evaluation of the self discharge rate.

It can be seen from FIG. 4 that the battery F of this example was lower in self discharge rate than the battery X of comparative example.

It is considered that this is because by the addition of the compound silicate to the positive electrode, negative electrode and separator, the precipitates in the separator form a double salt which is low in electronic conductivity and serves to slow down the self discharge rate.

From the positive electrode, Co added as a conductive agent dissolves out during a long period of time, and Co readily forms double salts with alkaline earth metals such as Ca and Mg. Moreover, corrosion of the hydrogen-absorbing alloy of the negative electrode proceeds during a long period of time to cause dissolution of Mn and Al therefrom. Mn and Al also readily form double salts with alkaline earth metals such as Ca and Mg. Therefore, since the metals dissolving out from the positive electrode or the negative electrode are passivated in each of the electrodes, precipitation of the metals in the separator is inhibited and increase of the self discharge rate is inhibited.

Furthermore, it is considered that since the compound silicate is also comprised in the separator, even when a very small amount of Co, Mn or Al reaches the separator, they form double salts and a conductive path is not formed, and, therefore, increase of the self discharge rate is inhibited.

It is a matter of course that the effects mentioned in Examples 1–5 can also be obtained in the battery F of this Example 6.

The compound silicate, yttrium oxide, ytterbium oxide and lutetium oxide used in the above Examples 1–6 are merely the embodiments and do not limit the invention, and other additives can also be used.

The accelerated evaluation based on temperature in the above examples was conducted at 80° C., and this corresponds to an accelerated evaluation of 45 times in terms of evaluation at 25° C. Accordingly, for example, 4 months at 80° C. corresponds to 4×45=180 months at 25° C.

As explained above, the present invention can provide nickel-metal hydride secondary batteries high in long-term reliability in use for backup purpose by adding a compound silicate to at least one of positive electrode, negative electrode and separator.

Having thus described the present invention, it is readily apparent that various modifications can be made by those who are skilled in the art without departing from the scope of the present invention. It is intended that the invention embraces these equivalents within the scope of the claims that follow.

What is claimed is:

1. A nickel-metal hydride secondary battery comprising a positive electrode comprising nickel hydroxide, a negative electrode comprising a hydrogen-absorbing alloy, a separator and an alkaline electrolyte, which further comprises a compound silicate.

2. A nickel-metal hydride secondary battery according to claim 1, which further comprises at least one material for increasing an oxygen evolution potential.

3. A nickel-metal hydride secondary battery according to claim 2, wherein the material for increasing an oxygen evolution potential is selected from the group consisting of yttrium oxide, ytterbium oxide and lutetium oxide.

4. A nickel-metal hydride secondary battery according to claim 1, wherein the compound silicate consisting essentially of a salt of a silicon dioxide and a compound metal oxide comprising at least two metals selected from the group consisting of Be, Mg, Ca, Zn, Sr, Ba and Ra.

5. A nickel-metal hydride secondary battery according to claim 1, wherein the compound silicate consisting essentially of a salt of silicon dioxide and a compound metal oxide of Mg and Ca.

6. A nickel-metal hydride secondary battery according to claim 1, wherein the compound silicate is represented by the formula $Mg_{4(1-x)}Ca_{4x}Si_6O_{15}(OH)_2$ (wherein x is 0<x<1).

7. A nickel-metal hydride secondary battery according to claim 1, wherein the compound silicate is added to at least one selected from the group consisting of the positive electrode, the negative electrode and the separator.

8. A nickel-metal hydride secondary battery according to claim 2, wherein the compound silicate is added to at least one selected from the group consisting of the positive electrode, the negative electrode and the separator and the material for increasing an oxygen evolution potential is added at least one selected from the group consisting of the positive electrode and the negative electrode.

* * * * *